W. O. STOUT.
DIRIGIBLE HEADLIGHT.
APPLICATION FILED MAR. 10, 1917.
1,308,204.
Patented July 1, 1919.
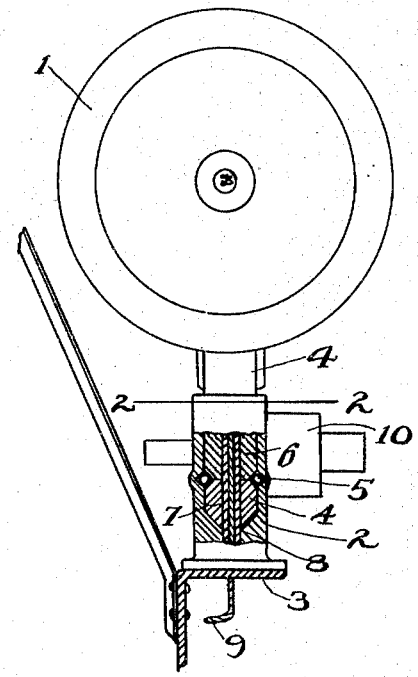
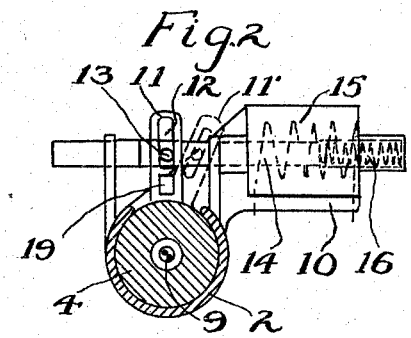
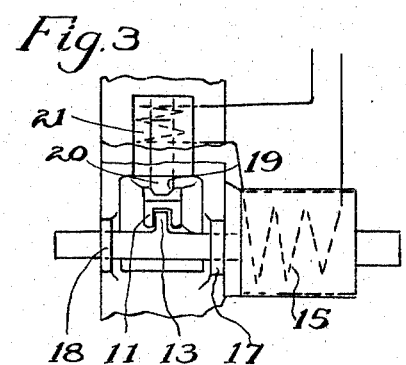
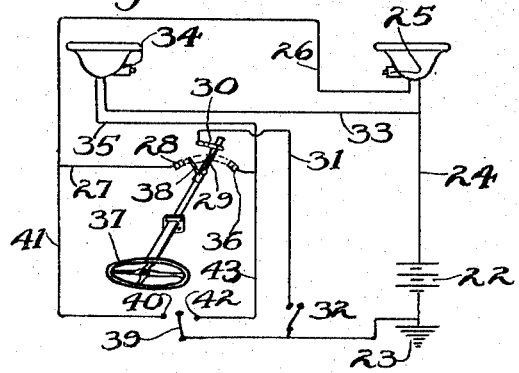
Inventor:
Wilfred Oakley Stout
by C. D. Enochs
Attorney

UNITED STATES PATENT OFFICE.

WILFRED OAKLEY STOUT, OF ST. PAUL, MINNESOTA.

DIRIGIBLE HEADLIGHT.

1,308,204.     Specification of Letters Patent.     Patented July 1, 1919.

Application filed March 10, 1917. Serial No. 154,054.

*To all whom it may concern:*

Be it known that I, WILFRED OAKLEY STOUT, a citizen of the United States, and a resident of St. Paul, in the county of Ramsey and State of Minnesota, have invented certain new and useful Improvements in Dirigible Headlights, of which the following is a specification.

One object of my invention is to provide electromagnetic means, manually operative, for turning the headlight of an automobile.

Another object of my invention is to provide means whereby this control of the headlight may be rendered automatic with the turning of an automobile.

Another object of my invention is to provide an electromagnetic means and mechanism by which the headlight on the right of the car may be turned to the left when the car is being turned to the left, and the headlight at the left of the car may be turned to the right when the car is being turned to the right, and to return the headlight to its normal position when the car is again traveling in an approximately straight forward direction.

With these and incidental objects in view, the invention consists of certain novel features of construction and combination of parts, the essential elements of which are hereinafter described with reference to the drawing which accompanies and forms a part of this specification.

In the drawing, Figure 1 is a front elevation of my improved headlight control showing part of the headlight bracket and frame in section.

Fig. 2 is a sectional view of my improved headlight control taken on the line 2—2, Fig. 1; Fig. 3 is a rear elevation of a portion of my improved headlight control showing the solenoid and plunger mounting; Fig. 4 is a wiring diagram such as would be used on any standard make of automobile.

Since the rays from an automobile headlight are ordinarily projected in lines parallel to the length of the automobile, the road about to be traveled on at a turn or curve is not illuminated. In order to project the rays of light onto this road, the headlight on the side opposite the direction of the turn is turned manually or by my automatic means so as to light up the road as soon as the steering wheel, which may operate suitable switches, is turned a definite number of degrees in the direction of the turn. When the steering gear is again operated, that is, when it returns the front wheels to their normal position, and consequently the direction of the car to its normal position, the headlight that has been turned may be automatically returned to its original position, or returned manually.

It is evident that in the construction of most automobiles, the headlight on the side to which one is turning cannot be turned in that direction without interfering with the fender of the car. It is also advantageous to have one light projecting its rays forwardly.

In Fig. 1 the headlight 1 is mounted on the bracket made up of bracket sleeve 2 and standard 4. The bracket sleeve 2 is bolted or riveted to the frame 3 which is shown in section.

The part in section shows the standard 4 resting on the ball-bearings 5 which are placed in an internal groove in the bracket sleeve 2, and in order to prevent the standard 4 from being lifted upwardly, it has fastened to it, the hollow post 6 by means of the sleeve 7.

The center of the bracket standard 4 and bracket sleeve 2 are hollow in order to permit the wire or wires, 8 of the headlight to pass down through the upper frame section 3 to point 9 where a suitable connection can be made.

On one side of the bracket is a casing 10 which contains the solenoid 15, and a spring 16, better shown in Fig. 2.

The standard 4 has attached to it the slotted arm 11 which receives in its slot 12 the pin 13 which is securely attached to the plunger 14 of the solenoid 15 contained in case 10. When the circuit controlling the solenoid is closed as when the steering gear is turned, the pin 13 moves the arm 11 to its dotted position 11', consequently turning the headlight.

The spring 16, which is placed at one end of the plunger 14, is compressed when the solenoid is actuated, and it returns the plunger to its normal position when the current is off. This construction is better shown in Fig. 3.

The plunger 14 is of square section where it passes through the slidable bearings 17 and 18 which are provided in order to keep the pin 13 in a vertical position to engage the slot 12 in the arm 11.

The upper part of the arm 11 has a socket 19 which receives the pin 20, which is operable by solenoid 21. This pin 20 is provided in order to hold the headlight in a fixed position while the car is traveling in a forward direction.

The solenoid 21 is connected in series with the solenoid 15 so the pin 20 may be lifted out of the socket 19 when the circuit is closed thus permitting the plunger 14 to be drawn into the solenoid 15 and compressing the spring 16, Fig. 2. When the circuit is broken the spring 16 returns the plunger to its original position.

In the Fig. 4, the battery or source of energy 22 is grounded by one terminal at 23, and its other terminal connects with the following circuit:

Wire 24, solenoid 25, wire 26, wire 27, knife switch 28, wire 29, brush 30, wire 31, switch 32, ground 23, for the right hand headlight's solenoid.

Circuit for the left hand solenoid is: wire 24, wire 33, solenoid 34, wire 35, knife switch 36, wire 29, brush 30, wire 31, switch 32; ground 23.

It is evident that when the circuit is broken at switch 32 the system becomes inoperative.

In order to manually turn the lights while the car is traveling in a forward direction, for then the steering gear is positioned for a forward motion of the automobile, and the portion of the switch 38 is not in contact with the points 28 or 36, the switch 39 is provided, and when the switch 39 makes contact with the points 40, the circuit of the right hand lamp is closed through wire 41, switch 39, ground 23, instead of wire 27, contact 28, wire 29, brush 30, wire 31, switch 32, ground 23.

When the switch 39 is placed on the point 42, the circuit of the left hand lamp is completed and the current then passes through wire 43, switch 39, to ground 23, instead of wire 35, to switch 36, wire 29, brush 30, wire 31, switch 32, to ground 23.

Thus it is seen that the right hand lamp is moved when contact is made through switch 38 and contact 28, or switch 39 and contact 40, and similarly the left hand lamp moves when switch 29 makes contact with brush 36 or when switch 39 closes on 42.

The pin 20 actuated by the solenoid 21 has comparatively little inertia, while the plunger 14 and the headlight actuated by the solenoid 15 have a comparatively large amount of inertia, hence when the two solenoids are connected in series the plunger pin 20 is withdrawn before the headlight begins to rotate.

This method is only one of many that may be utilized to have a self-locking and automatically releasing catch for the headlight in its normal position, and while only this one method is shown, I expect to claim this particular feature broadly.

While I have described my invention and illustrated it in one particular design, I do not wish it understood that I limit myself to this construction, as it is evident that the application of my invention may be varied in many ways within the scope of the following claims.

Claims:

1. In a dirigible headlight revolving mechanism, the combination of a stationary bracket, a movable bracket journaled in said stationary bracket, an arm connected to said movable bracket, a solenoid mounted on said stationary bracket, a plunger acting in said solenoid and connected with said arm so as to rotate said bracket when said solenoid is excited.

2. In a dirigible headlight revolving mechanism, the combination of a stationary bracket, a movable bracket journaled in said stationary bracket, an arm connected to said movable bracket, a solenoid mounted on said stationary bracket, a plunger acting in said solenoid, a spring acting on said plunger in opposition to the action of said solenoid, said spring returning said plunger and said arm to a fixed position when said solenoid ceases to act.

3. In a dirigible headlight revolving mechanism, the combination of a stationary bracket, a movable bracket journaled in said stationary bracket, an arm extending from said movable bracket, a solenoid mounted on said stationary bracket, a plunger pin coacting with said solenoid, and a socket positioned in said arm to receive the end of said plunger pin when said solenoid is ineffective, said arm being free to move when said pin is drawn from said socket by the action of said solenoid.

4. In a dirigible headlight revolving mechanism, the combination of a right hand headlight, a left hand headlight, a steering wheel, a steering shaft connected to said steering wheel, a switch associated with said steering shaft, a means for operating said left hand headlight when said steering shaft, with said switch, is turned to the right, means for operating said right hand headlight when said steering shaft, with said switch, is turned to the left, and means for rendering the aforesaid means ineffective.

5. In dirigible headlights and mechanism therefor, the combination of a right hand headlight and a left hand headlight, an electric circuit including electromagnetic means for turning said right hand headlight to the left, and electromagnetic means for turning said left hand headlight to the right, and a manually operated switch for controlling, through said electric circuit, the revolving of either of said headlights at will.

6. In a dirigible headlight revolving mechanism, the combination of a rotatable headlight support, electromagnetic means for rotating said support, means for locking said support in a straight ahead position, and electromagnetic means for unlatching said locking means.

7. In a dirigible headlight revolving mechanism, the combination of a rotatable headlight support, electomagnetic means for revolving said rotatable support, locking means associated with said headlight support, electromagnetic means for unlatching said locking means, and means for causing said unlatching electromagnetic means to be actuated before said electromagnetic turning means is actuated.

WILFRED OAKLEY STOUT.

Copies of this patent may be obtained for five cents each, by addressing the "Commissioner of Patents, Washington, D. C."